United States Patent [19]
Danieau

[11] Patent Number: 5,803,160
[45] Date of Patent: Sep. 8, 1998

[54] APPARATUS FOR HEATING AND VENTILATING, AND/OR AIR CONDITIONING, THE CABIN OF A MOTOR VEHICLE

[75] Inventor: Jacques Danieau, Noisy le Roi, France

[73] Assignee: Valeo Climatisation, La Verriere, France

[21] Appl. No.: 793,208
[22] PCT Filed: Jun. 14, 1996
[86] PCT No.: PCT/FR99/00920
 § 371 Date: Feb. 14, 1997
 § 102(e) Date: Feb. 14, 1997
[87] PCT Pub. No.: WO97/00178
 PCT Pub. Date: Jan. 3, 1997

[30] Foreign Application Priority Data

Jun. 14, 1995 [FR] France .................................. 95 07093

[51] Int. Cl.⁶ ............................................. B60H 1/32
[52] U.S. Cl. ........................ 165/42; 454/121; 454/156
[58] Field of Search .................... 454/121, 156; 165/42

[56] References Cited

U.S. PATENT DOCUMENTS 4,907,497  3/1990  Danieau .................................... 98/2.08
5,217,405  6/1993  Tanaka ..................................... 454/121

FOREIGN PATENT DOCUMENTS

202106  11/1983  Japan ...................................... 454/156
167316   9/1984  Japan ...................................... 454/156

Primary Examiner—Harold Joyce
Assistant Examiner—Derek S. Boles
Attorney, Agent, or Firm—Morgan Finnegan, L.L.P.

[57] ABSTRACT

A heating/ventilating and/or air conditioning device for a motor vehicle passenger compartment. The device includes a blower element containing a motor-fan unit, a heating element containing a heating radiator, and a duct element between the blower element and the heating element. The three elements together form a modular assembly for use in various kinds of vehicles. the blower element comprises at least one coupling surface engageable by an air inlet element specifically configured according to the vehicle in question, and the heating element comprises at least one coupling surface engageable by at least one air outlet element selected according to the vehicle in question.

20 Claims, 5 Drawing Sheets

APPARATUS FOR HEATING AND VENTILATING, AND/OR AIR CONDITIONING, THE CABIN OF A MOTOR VEHICLE

This invention relates to apparatus for heating and ventilating, and/or air conditioning, the cabin of a motor vehicle of the type, comprising a blower element having at least one air inlet and containing a motor-blower unit, a heating element having at least one air outlet and containing a heating radiator, together with a trunk element which is interposed between the blower element and the heating element.

An apparatus of this type is known, in particular from Japanese Utility Model No. 1 766 063.

In an apparatus of this kind, fresh air taken from outside the cabin, and/or recirculated air which is drawn from the cabin, is admitted into the blower element, accelerated by the motor-blower unit, and is then delivered, via the trunk element, into the heating element.

In this last mentioned element, the air may be heated before being distributed into the cabin through outlet ports provided for this purpose.

If necessary, such an apparatus may contain an evaporator for cooling an air stream before it enters the heating unit, which enables a stream of conditioned air to be provided.

One of the main drawbacks of such an apparatus is that it has to be made each time in a specific form according to the type of vehicle in which it is intended to be fitted.

Thus, a specific apparatus corresponding to each type of vehicle has to be provided, so that it can be accommodated within the structure of the vehicle and be connected to various component parts of the vehicle.

As a result, specific arrangements have to be made each time in order to respond to various technical problems or requirements.

Thus, the apparatus has to match the general configuration of the vehicle each time, especially in regard to geometry and styling, and it has to satisfy various additional requirements, in particular that of torsional rigidity, or even safety, imposed by the results of anti-collision tests.

Equally, the apparatus must enable various main functions, provided in the driver's part of the cabin, to be properly accommodated and fitted.

In this regard, different interfaces have to be provided for each vehicle as regards the fixing in position of the air treatment or air conditioning apparatus, the arrangement of the air inlet, the passage of various connections (for fluids, electricity, etc.) through the bulkhead, connection to the air distribution vents which are arranged on the fascia panel of the vehicle (e.g. for the de-icing and ventilation functions) and to the air distribution vents which are arranged in the lower part of the cabin for the purpose of directing air towards the feet of the occupants, both in the front of the cabin and in the rear of the cabin.

These various requirements increase the number of components and therefore the selling price of apparatuses of this type, because a given apparatus can only be suitable for a vehicle of one given type.

This therefore militates against the desire for standardisation defined by motor manufacturers.

A main object of the invention is to overcome the above mentioned drawbacks.

The invention starts with the principle that most heating and ventilation and/or air conditioning apparatuses for motor vehicles of similar types do in fact have similar functions.

To this end, it proposes an apparatus of the type defined in the introduction hereof in which the blower element, the heating element and the trunk element constitute a modular assembly which can be used for different types of vehicles, in which the blower element has at least one attachment surface adapted to receive an air inlet element, which is matched to the said attachment surface and which has a specific configuration chosen according to a given vehicle, and in which the heating element has at least one attachment surface which is adapted to receive an air outlet element, which is matched to the said attachment surface and which has a specific configuration chosen according to the said given vehicle.

Thus, the apparatus of the invention comprises a modular assembly which may also be referred to as a "standard module", which can be suitable for a plurality of types or models of vehicles in related ranges, together with an air inlet element and an air outlet element, both of which are made in a specific way and which are suitable each time for a given vehicle.

The said air inlet element and the said air outlet element thus constitute specific adapting elements which can serve as interfaces between the modular assembly and a given type of vehicle.

Improved standardisation results from the fact that the modular assembly can be used for different types or models of vehicles, and this reduces the selling price of the apparatus and also reduces the number of components which the manufacturer has to deal with.

In a preferred embodiment of the invention, the blower element, the heating element and the trunk element are made in the form of casings which are joined together so as to constitute the modular assembly mentioned above.

Preferably, the air inlet element has at least one aperture for the admission of air to the cabin from outside, and a connecting surface having a form which is matched to the attachment surface of the blower element.

The attachment surface for the blower element thus serves only for admission of fresh air from outside.

In that case, the invention provides that the blower element further includes at least one aperture for the admission of recirculated air drawn from the cabin of the vehicle.

Preferably, the blower element comprises a first envelope which includes the attachment surface for the air inlet element, and which contains at least one air admission valve, together with a second envelope in the form of a volute, communicating with the first envelope, containing the motor-blower unit, and communicating with the trunk element.

According to another feature of the invention, the blower element has an attachment surface for attachment of a fastening element.

The said fastening element, which holds the apparatus in position in the structure in the vehicle, may be arranged on a specific attachment surface.

In one preferred embodiment of the invention, the fastening element comprises a fastening lug which is fixed to the air inlet element. The said fastening element may for example be made integrally with the said air inlet element.

According to a further feature of the invention, the heating element has a first attachment surface for attachment of an air outlet element for de-icing, a second attachment surface for attachment of an air outlet element for ventilation, and a third attachment surface for an attachment of an air outlet element for heating the feet of the passengers.

Preferably, the first attachment surface and the second attachment surface are formed on a common face of the heating element, and the air outlet element for de-icing and the air outlet element for ventilation are grouped together in a single element, which is adapted to be carried on the heating element, while the third attachment surface is formed on an opposite face of the heating element.

Thus, a single air outlet element can service, at the same time, the de-icing and de-misting vents for the windscreen and the ventilators which are commonly situated on the fascia panel of the vehicle. As to the air outlet element for heating the feet of the occupants, this is orientated towards the lower part of the cabin.

According to another feature of the invention, the heating element has at least one attachment surface for attachment of a fastening element.

The fastening element may comprise a fastening lug fixed to an air outlet element.

Alternatively or in addition, the said fastening element may comprise a fastening bracket, which is adapted to be fixed on a boss of the heating element.

In a preferred embodiment of the invention, the fastening of the apparatus is obtained by means of a fastening lug which is fixed to the air inlet element, a fastening lug fixed an air outlet element, and a fastening lug fixed to the heating element.

The radiator contained in the heating element preferably includes at least one water header, together with tubular connections for admission and evacuation of a heat transfer fluid, which is typically the coolant fluid for the engine of the vehicle.

Preferably, the tubular connections are made in the form of a specific removable unit which is adapted to be fitted to at least one of the water headers of the radiator.

The trunk element which joins the blower element to the heating element may contain a filter for filtering the air before the latter enters the heating element.

In the case where the vehicle is equipped with an air conditioning option, the evaporator is preferably contained in the trunk element, which enables the air to be cooled before it enters the heating duct.

It is therefore possible to provide three types of trunk element, mainly a trunk element by itself, a trunk element containing a filter, and a trunk element containing an evaporator.

In another version, the evaporator may be contained in the heating unit, upstream of the heating radiator.

In the following description, which is given by way of example, reference is made to the attached drawings, in which.

Figure 1:
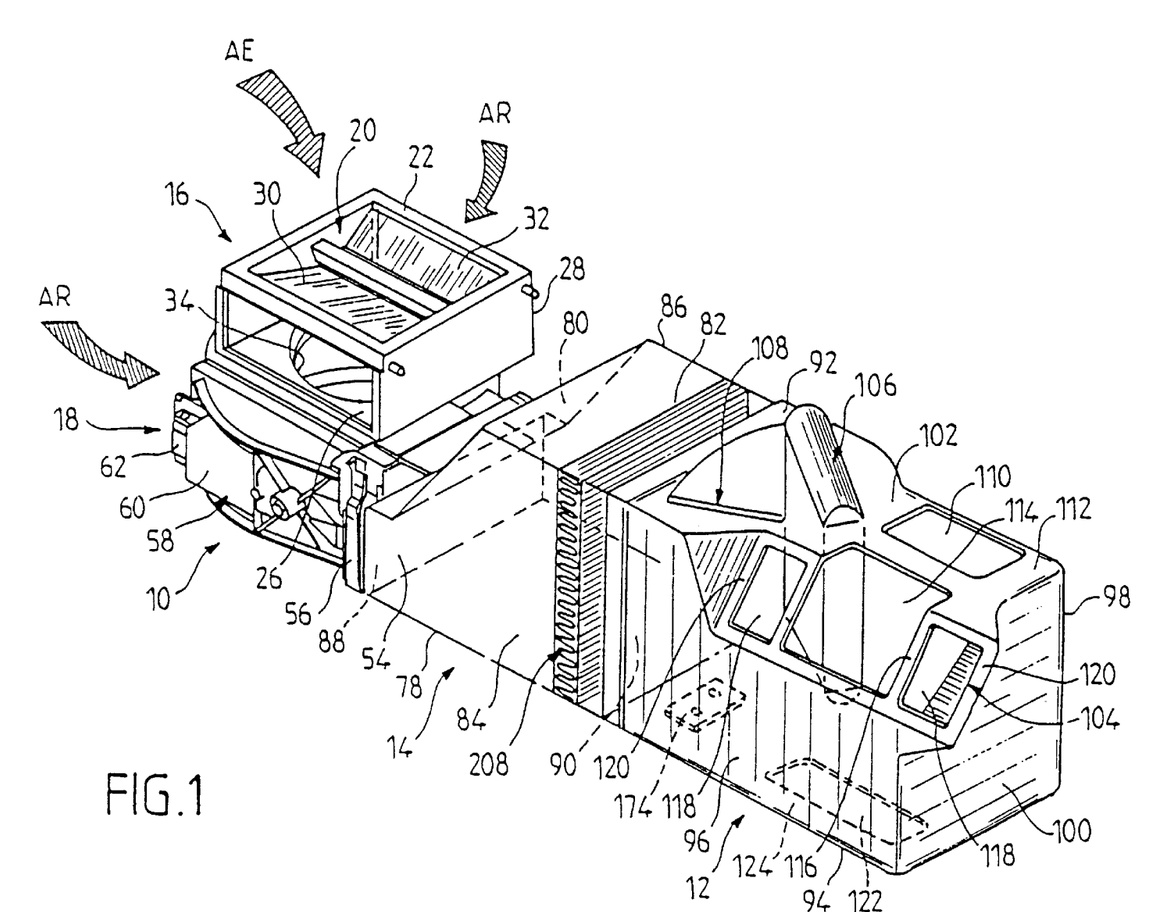
FIG. 1 is a perspective view of a modular assembly forming part of an apparatus for heating and ventilation, and/or air conditioning, in accordance with the invention.

The modular assembly in FIG. 1 consists essentially of a blower element 10, a heating element 12 and a trunk element 14, which is interposed between the blower element and the heating element. The elements, 10, 12 and 14 are made in the form of casings which are joined together and which are disposed in alignment with each other. These casings are so designed that they can be fitted transversely in a motor vehicle, below the fascia panel (not shown) of the latter.

The blower element 10 consists of two envelopes 16 and 18 in a vertically superimposed arrangement.

The envelope 16, which is located in the upper position, has the general form of a parallelepiped. It has an open face 20 which is surrounded by a rectangular peripheral flange 22 (FIG. 1), which defines an attachment surface for an air inlet element 24 (FIG. 2), that is adapted to serve as an interface between the blower element 10 and air inlet grid (not shown), the latter being arranged for example under the hood of the vehicle. The open face 20 receives a stream of fresh air AE from outside (as indicated by the arrow in FIG. 1).

The envelope 16 also has two opposed side apertures 26, 28 (FIGS. 1 and 2), defined by open faces of the envelope and arranged to serve for the admission of recirculated air AR, as indicated by the arrows in FIG. 1. The side apertures may be provided with protective grilles.

The envelope 16 also contains two flap valves 30 and 32 (FIG. 1), for adjusting the distribution between the fresh air AE and the recirculated air AR that penetrates into the interior of the envelope 16. The latter further has a circular aperture 34 which puts the interior of the envelope 16 into communication with the interior of the envelope 18.

The envelope 18 (FIG. 2) is bounded by a peripheral wall 36 in the form of a volute, and by a base wall 38 which has a generally U-shaped opening 40. This opening 40 enables a wall 42 (see the lower part of FIG. 2), which has a U-shaped anterior edge 44 adapted to fit sealingly in the opening 40 of the wall 38, to be inserted in position in the manner of a drawer. The wall 42 also has a posterior edge 46 which is substantially straight.

Figure 2:
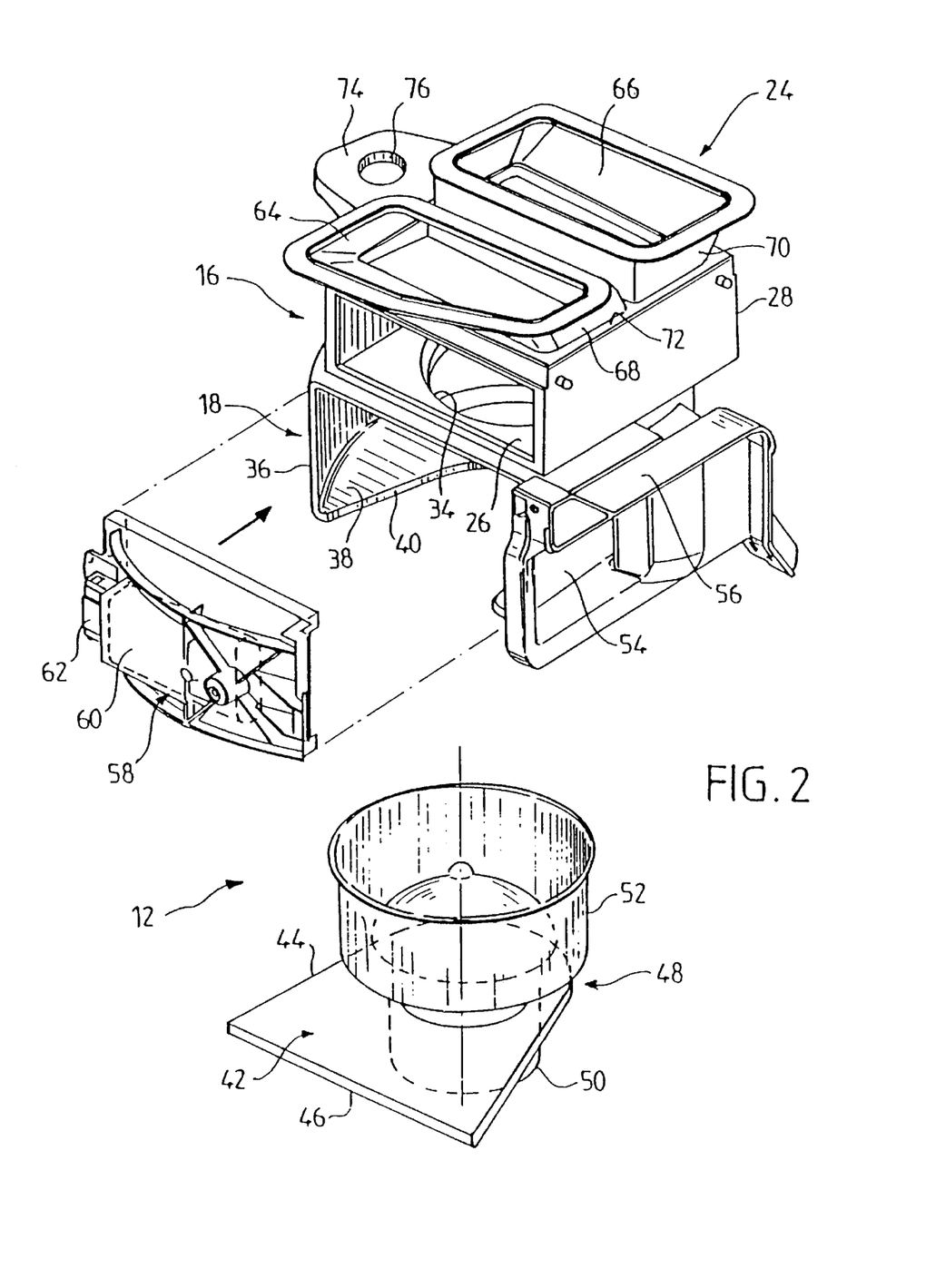
FIG. 2 is an exploded perspective view of the blower element of the modular assembly of FIG. 1.

When the wall 42 is fitted in the wall 38, it constitutes with the latter the base of the envelope 18. The wall 42 supports a motor-blower unit 48, which consists of an electric motor 50 disposed in an appropriate housing, together with a blower 52 which is mounted on the shaft of the motor. The blower 52 is arranged to draw a stream of air through the aperture 34, and to deliver this air stream through a side aperture 54 which is surrounded by a flange 56 by which the envelope 18 is joined to the trunk element 14 (FIG. 1).

The envelope 18 further includes a shroud 58 which is arranged to be fixed sealingly on an open side face of the envelope, so as completely to close the said envelope and to maintain the wall 42 and motor-blower unit 48 in position.

The shroud 58 incorporates a module 60 which includes electrical resistances (not shown) that enable the speed of rotation of the motor 50 to be varied, together with an electrical connection 62.

The above mentioned attachment surface 22 is arranged to receive a specific air inlet element, which is selected according to the type of vehicle to be equipped.

In the case of FIG. 2, the air inlet element 24 includes, in its upper part, two air admission ports 64, 66, having a substantially rectangular cross section and bounded by two ducts 68,70 respectively, which terminate at a junction surface 72 having a form which is matched to the attachment surface 22 of the blower element 10. The junction surface 72 has a flange with a rectangular contour, which is arranged to be fixed sealingly on the attachment surface 22 by appropriate fastening means, such as screws or the light (not shown).

The air inlet element 24 is made by moulding in a plastics material, and it includes an integral fastening lug 74 having a hole 76. This lug enables the apparatus to be fastened to the structure of the vehicle.

In a modified version it is possible to design a lug that would be fixed on another attachment surface of the blower element 10, which would be dedicated to the fastening of this lug.

As will be seen later herein, the attachment surface 22 may receive other types of air inlet elements, each adapted for use in the type of vehicle concerned.

The trunk element 14 (FIG. 1) includes a base wall 78, a top wall having an inclined portion 80 and a flat portion 82, and two side walls 84 and 86. The element 14 is joined to the element 10 through the flange 56, and it has an open face 88 which communicates with the open face 54 of the envelope 18. In addition, the element 14 has a further open face 90 which communicates with the heating element 12.

The latter is made in the form of a casing having the form substantially of a parallelepiped. This casing is joined to the element 12 through a connecting flange 92 in the form of a rectangular frame. The element 12 has a base wall 94, two side walls 96 and 98, an end wall 100 (opposite to the open face 90), a top wall 102 and an inclined wall 104 which joins the side wall 96 to the top wall 102.

The heating element 12 contains a heating radiator 106 through which a hot heat transfer fluid is able to flow, for example the coolant fluid for the engine of the vehicle, and a mixing valve 108 which is arranged to control the air stream that passes through the radiator, so as to obtain a flow of mixed air, the temperature of which is controlled. This stream of mixed air is then delivered into the cabin of the vehicle through outlet ports of the casing, via appropriate distribution means.

The heating element 12 has an air outlet port 110, of generally rectangular form, which is formed through the top wall 102 and surrounded by an attachment surface 112. This port 110 is arranged to be connected to an air outlet element (which will be described later herein), for providing the functions of de-icing and/or de-misting of the windshield of the vehicle.

The element 12 also has a generally rectangular aperture 114 which is formed partly through the top wall 102 and partly through the inclined wall 104. This aperture 114 is surrounded by an attachment surface 116. The aperture 114 is flanked by two further apertures 118, both of which are formed through the inclined wall 104, and each of which is surrounded by an attachment surface 120.

The attachment surface 116 and the two attachment surfaces 120 are provided for the purpose of connecting an air outlet element for delivering air towards ventilation ports arranged on the fascia panel of the vehicle.

The element 12 further includes an outlet port 122, formed in the base wall 94 and surrounded by an attachment surface 124.

Figure 3:
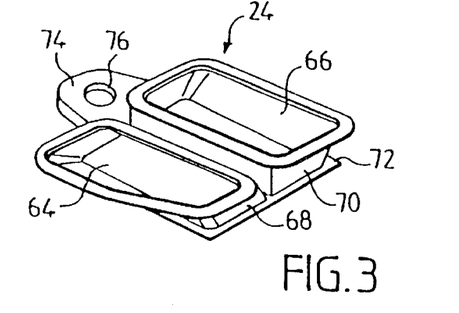
FIGS. 3 and 4 are perspective views of two different air inlet elements suitable for fitting on the blower element.
Figure 4:
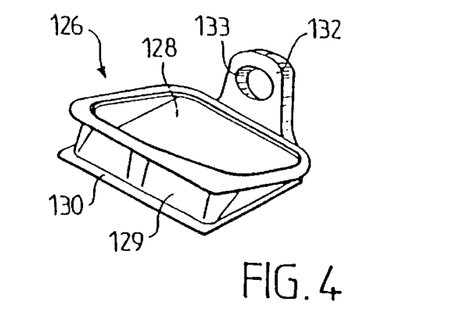

The air inlet element 24 (FIGS. 2 and 3) may be replaced by another air inlet element, and in particular by an air inlet element 126 such as is shown in FIG. 4.

This latter has a single air inlet 128 which is bounded by a duct 129 joined to a connecting surface 130. The element 126 is made by moulding in a plastics material and includes, again formed integrally by moulding, a fastening lug 132 formed with a hole 133, this lug having a different orientation from lug 74 of the outlet element 24.

The attachment surface 112, and also the attachment surface 116 and the two attachment surfaces 120, permit the attachment of an outlet element 134 (FIG. 5), which has a connecting surface 136 which is matched to the above mentioned attachment surfaces. The element 134 therefore overlies the air outlet apertures 110, 114 and 118. It includes a duct 138 for connecting the port 110 to at least one de-icing/de-misting port (not shown). It also includes a duct 140 in the form of a chimney, which is arranged to connect the outlet aperture 114 to a ventilator (not shown) which is arranged on the fascia panel of the vehicle. It further includes two side ducts 142, flanking the duct 140 and arranged to put the outlet apertures 118 into communication with further ventilators.

Figures 5, 6, 7, 8, 9, 10, 11, 12:
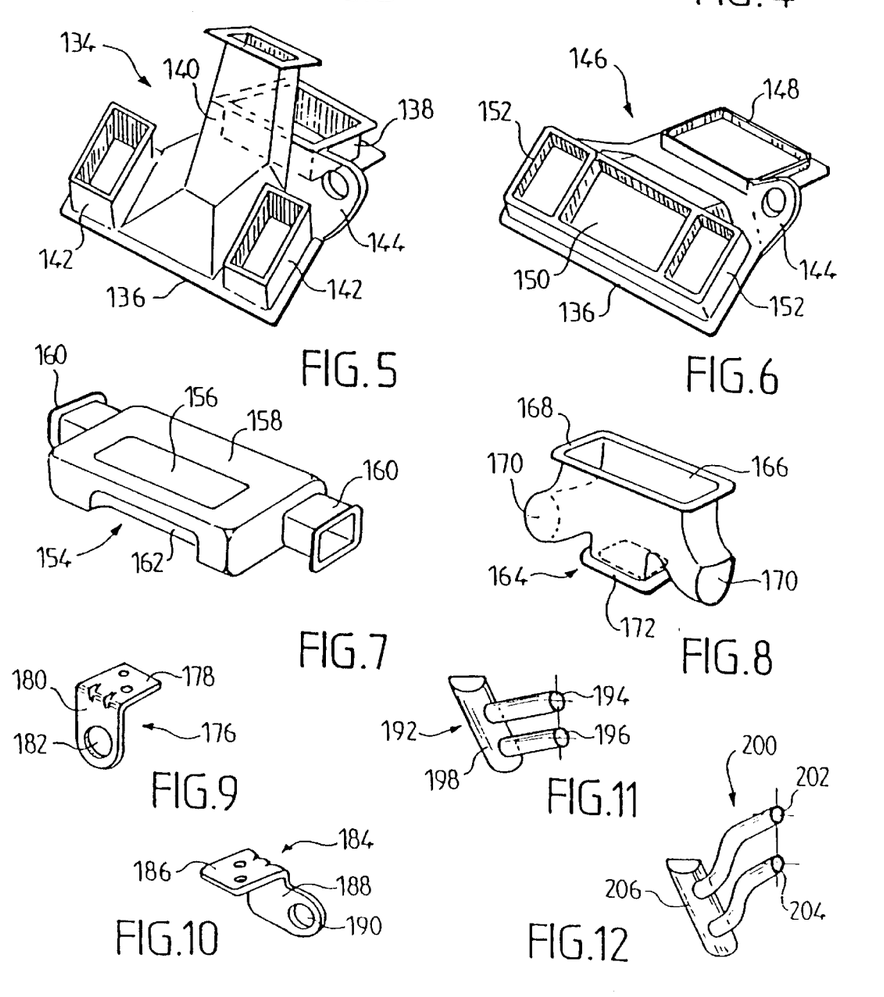
FIGS. 5 and 6 are perspective views of two air outlet elements suitable for fitting on the heating element, for the purposes of de-icing and ventilation.
FIGS. 7 and 8 are perspective views of two air outlet elements suitable for fitting on the heating element for the purpose of heating the feet of the occupants.
FIGS. 9 and 10 are perspective views of two fastening brackets of different designs, suitable for fitting on a boss of the heating element.
FIGS. 11 and 12 are perspective views of two removable units including tubular connections and suitable for fitting to one of the water headers of the heating radiator of the heating element.

The air outlet element 134 also has an integral fastening lug 144 whereby the apparatus can be secured to another part of the structure of the vehicle.

The air outlet element 134 may be replaced by the air outlet element 146 in FIG. 6, which is designed for another type of vehicle. This element 146 again has a connecting surface 136, identical or similar to that in the element 134, together with a duct 148 which replaces the duct 138, a duct 150 which replaces the duct 140, and two ducts 152 which replace the two ducts 142. The ducts of the element 146 have different geometries for adaptation to another type of vehicle.

Here again, the element 146 includes an integral fastening lug 144, which is identical or similar to that in the element 134.

The attachment surface 126 which surrounds the aperture 122 and the element 12 (FIG. 1) may serve to connect an air outlet element 154 as shown in FIG. 7. This element is made in the form of a generally rectangular hollow body which has an aperture 156, for communicating with the aperture 122 and surrounded by a connecting surface 158 which is matched to the attachment surface 124. The hollow body also has two side air outlets 160, which are open towards the front part of the cabin, together with a central air outlet 162 for connection to a duct for the purpose of carrying air towards the rear part of the cabin, towards the feet of the occupants of the vehicle.

In place of the air outlet 154, it is possible to make use of another air outlet element 164, as shown in FIG. 8, which has a different geometry. This latter comprises a hollow body defining an aperture 166, which is surrounded by a connection surface 168 adapted to cooperate with the attachment surface 124. The element 164 also has two side outlets 170, for delivering air towards the feet of the passengers in the front of the cabin, together with a central outlet 172 for delivering air towards the feet of the passengers and to the rear of the cabin, via an interposed duct which is not shown.

Below the base wall 94 of the heating element 12, there is further provided a boss 174 (FIG. 1) for the attachment of a fastening bracket 176 as shown in FIG. 9. This bracket, which is preferably made of sheet steel, is adapted to be riveted on the boss. It comprises a wing portion 170 for fastening to the boss, and a wing portion 180 which is formed at right angles to the wing portion 178, and which has a hole 182.

In place of the fastening bracket 176, it is possible to make use of a fastening bracket 184 (FIG. 10), which is again made of sheet steel. This bracket has a wing portion 186 for fastening to the boss, and a wing portion 188 which is joined to the wing portion 186 at right angles and which is extended laterally, this wing portion being provided with a hole 190.

Thus, the apparatus of the invention is fundamentally adapted to be fixed to the structure of the vehicle by means of three different brackets, namely a lug forming part of the air inlet element 24 or 126, a lug which is part of the air outlet element 134 or 146, and a bracket 176 or 184 which is fixed under the heating element 12.

The radiator 106 can receive a removable unit 192 which includes two inlet-outlet tubular connections 194, 196, and which is suitable for fitting on one of the water headers, in this example the top header 198, of the radiator (FIG. 11).

In another version, it may receive a unit 200 which comprises two tubular connections 202 and 204 matched to one of the water headers, in this example the lower water header 206, of the heating radiator.

As is shown in FIG. 1, the trunk assembly 14 may contain a filter 208 for filtering the air before it enters the heating assembly 12.

Figure 13:
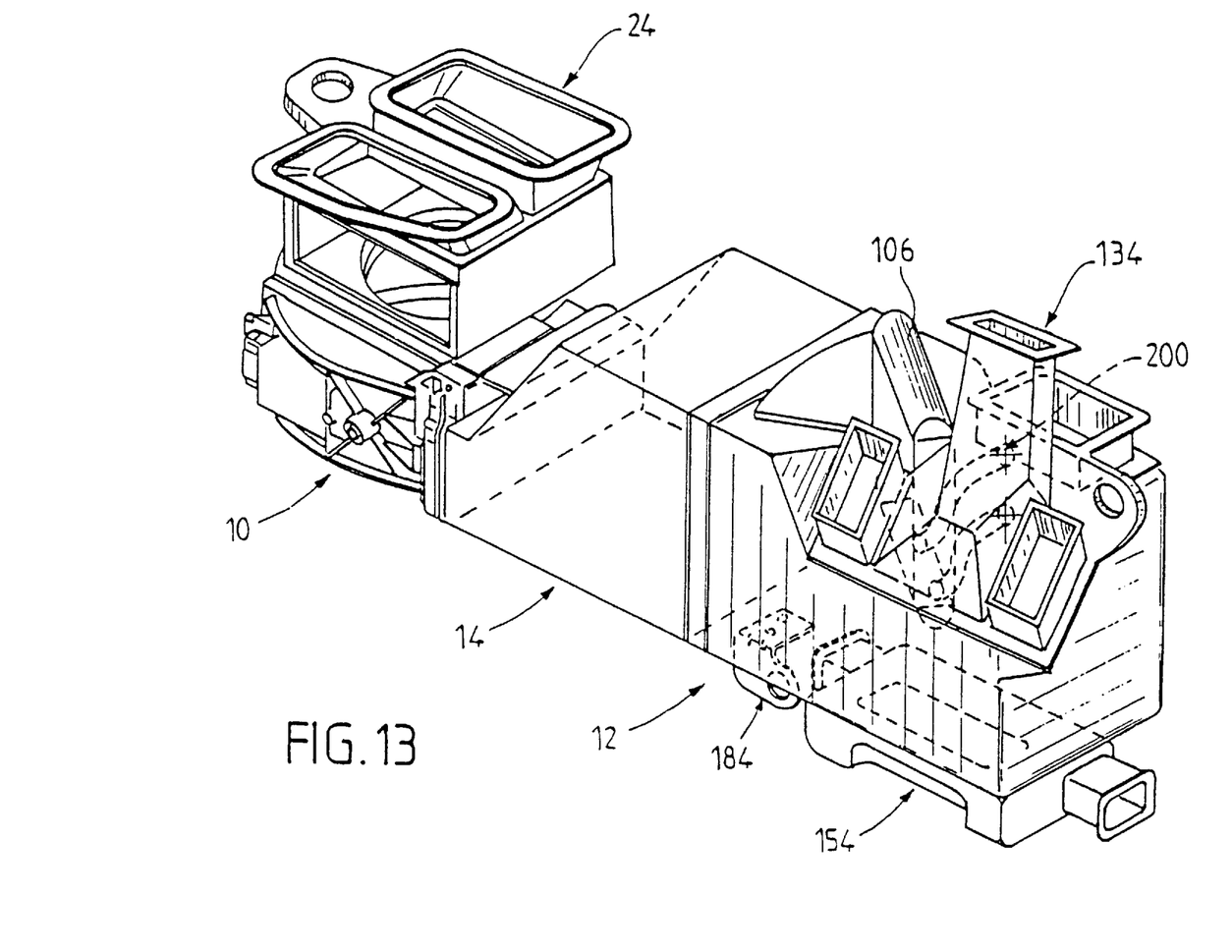
FIG. 13 is a perspective view of an apparatus according to the invention formed from the modular assembly of FIG. 1.

In the embodiment in FIG. 13, to which reference is now made, the apparatus comprises the basic modular assembly constituted by the three elements 10, 12 and 14. It also includes the air inlet element 24 of FIGS. 2 and 3, the air outlet element 134 of FIG. 5, the air outlet element 154 of FIG. 7, a fastening bracket similar to the fastening bracket 184 in FIG. 10, and the set of tubular connections 200 of FIG. 12.

Figure 14:
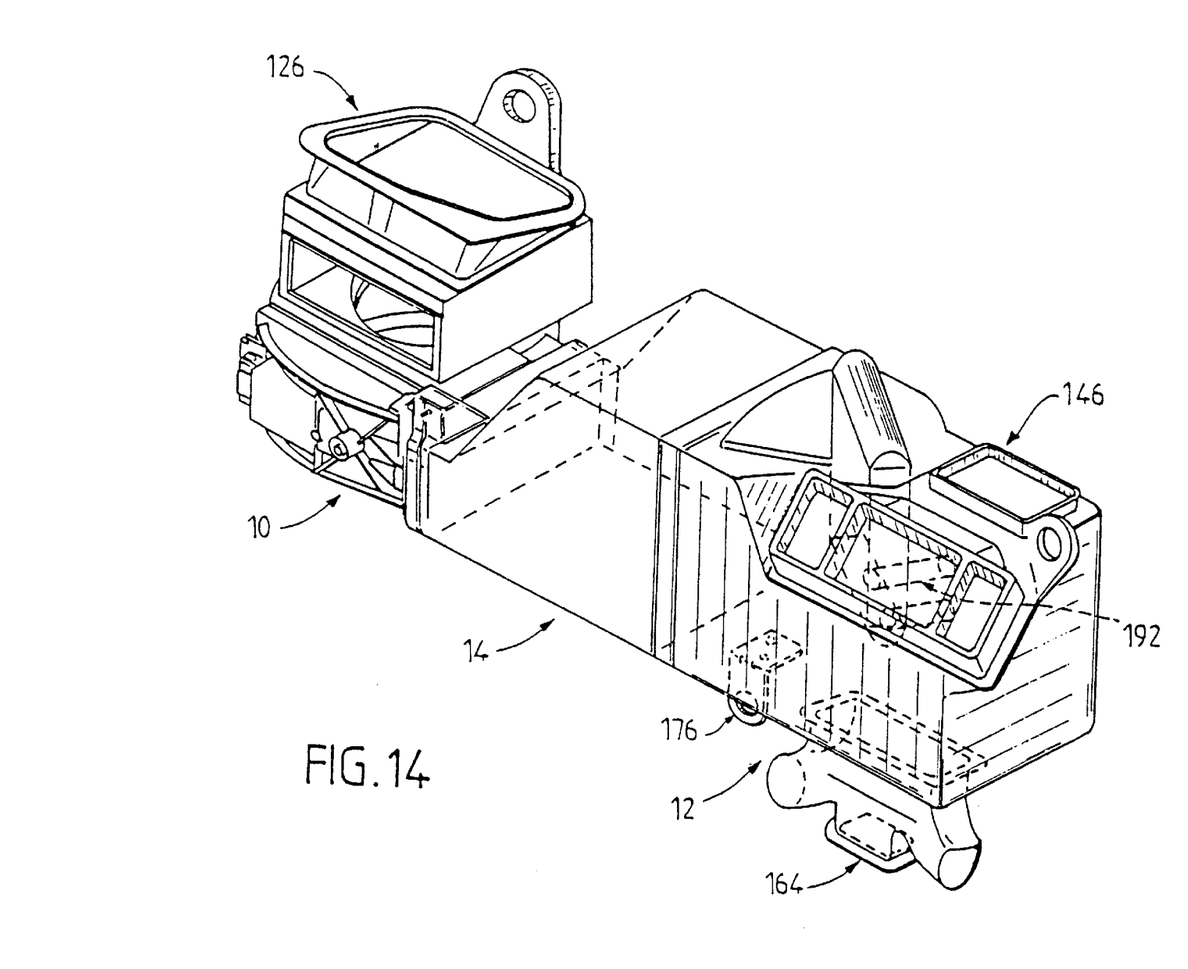
FIG. 14 is a perspective view of another apparatus obtained from the modular assembly of FIG. 1.

In the embodiment in FIG. 14, to which reference is now made, the apparatus comprises the same modular assembly, together with the air inlet element 126 of FIG. 4, the air outlet element 146 of FIG. 6, the air outlet element 164 of FIG. 8, the fastening bracket 176 of FIG. 9, and the tubular connector unit 192 of FIG. 11.

The invention is of course not limited to the embodiments described above by way of example, and it is possible to envisage other versions.

It will be understood that the basic modular assembly may be used on different types of vehicle, generally in similar ranges, provided that, each time, an air inlet element, one or more air outlet elements, and suitably adapted fastening brackets, are provided.

In one modified version it is possible to provide an air conditioning evaporator, which is preferably arranged in the trunk unit 14, or, where appropriate, at the inlet of the heating assembly 12.

The apparatus of the invention thus facilitates to standardisation, due to the use of elements which are common to various different types of vehicles.

It can be envisaged that a symmetrical arrangement can be used in the case of a vehicle adapted for driving on the left.

I claim:

1. Apparatus for heating and air conditioning the cabin of a motor vehicle, comprising:
   a blower element including a motor-blower unit, at least one air inlet element selected from a plurality of types of air inlet elements, and at least one attachment surface for receiving the plurality of types of air inlet elements;
   a heating element including a heat radiator, at least one air outlet element selected from a plurality of types of air outlet elements, and at least one attachment surface for receiving the plurality of types of air outlet elements; and
   a trunk element being interposed between the blower element and the heating element, wherein the blower element, the heating element and the trunk element constitute a modular assembly which can be used for different types of vehicles; and
   wherein the radiator includes at least one water header and tubular connections for the admission and evacuation of a heat transfer fluid, and wherein the tubular connections are made in the form of a specific removable unit which is adapted to be fitted to at least one of the water headers of the radiator.

2. Apparatus according to claim 1, wherein the blower element, the heating element and the trunk element are made in the form of casings which are joined together so as to constitute said modular assembly.

3. Apparatus according to claim 1, wherein the air inlet element has at least one air inlet aperture for the admission of air to the cabin from outside, and a connecting surface having a form which is matched to the attachment surface of the blower element.

4. Apparatus according to claim 3, wherein the blower element further includes at least one aperture for the admission of recirculated air drawn from the cabin of the vehicle.

5. Apparatus according to claim 1, wherein the blower element comprises a first envelope which includes the attachment surface for the air inlet element, and which contains at least one air admission valve, together with a second envelope in the form of a volute, communicating with the first envelope, containing the motor-blower unit, and communicating with the trunk element.

6. Apparatus according to claim 1, wherein the blower element has an attachment surface for attachment of a fastening element.

7. Apparatus according to claim 6, wherein the fastening element comprises a fastening lug which is fixed to the air inlet element.

8. Apparatus according to claim 1, wherein the heating element has a first attachment surface for attachment of an air outlet element for de-icing, a second attachment surface for attachment of an air outlet element for ventilation, and a third attachment surface for an attachment of an air outlet element for heating the feet of the occupants of the vehicle.

9. Apparatus according to claim 8, wherein the first attachment surface and the second attachment surface are formed on a common face of the heating element, and wherein the air outlet element for de-icing and the air outlet element for ventilation are grouped together in a single element, which is adapted to be carried on the heating element, while the third attachment surface is formed on an opposite face of the heating element.

10. Apparatus according to claim 1, wherein the heating element has at least one attachment surface for attachment of a fastening element.

11. Apparatus according to claim 10, wherein the fastening element comprises a fastening lug fixed to an air outlet element.

12. Apparatus according to claim 10, wherein the fastening element comprises a fastening bracket, which is adapted to be fixed on a boss of the heating element.

13. Apparatus according to claim 1, wherein the trunk element contains a filter for filtering the air before the latter enters the heating element.

14. Apparatus according to claim 1, wherein the trunk element contains an evaporator for cooling the air before the latter enters the heating element.

15. Apparatus according to claim 2, wherein the air inlet element has at least one air inlet aperture for the admission of air to the cabin from outside, and a connecting surface having a form which is matched to the attachment surface of the blower element.

16. Apparatus according to claim 4, wherein the blower element comprises a first envelope which includes the attachment surface for the air inlet element, and which contains at least one air admission valve, together with a second envelope in the form of a volute, communicating with the first envelope, containing the motor-blower unit, and communicating with the trunk element.

17. Apparatus according to claim 5, wherein the blower element has an attachment surface for attachment of a fastening element.

18. Apparatus according to claim 7, wherein the heating element has a first attachment surface for attachment of an air outlet element for de-icing, a second attachment surface for attachment of an air outlet element for ventilation, and a third attachment surface for an attachment of an air outlet element for heating the feet of the occupants of the vehicle.

19. Apparatus according to claim 9, wherein the heating element has at least one attachment surface for attachment of a fastening element.

20. Apparatus according to claim 11, wherein the fastening element comprises a fastening bracket, which is adapted to be fixed on a boss of the heating element.

* * * * *